United States Patent

McGonigle et al.

Patent Number: 5,575,438
Date of Patent: Nov. 19, 1996

[54] UNMANNED VTOL GROUND SURVEILLANCE VEHICLE

[75] Inventors: Kevin P. McGonigle, Milford; John Ferraro, Clinton; James P. Cycon, Orange, all of Conn.

[73] Assignee: United Technologies Corporation, Hartford, Conn.

[21] Appl. No.: 239,645

[22] Filed: May 9, 1994

[51] Int. Cl.⁶ .................................................. B64D 47/00
[52] U.S. Cl. ...................... 244/13; 244/17.11; 244/118.1; 244/129.1; 343/705
[58] Field of Search .......................... 244/1 R, 13, 17.11, 244/12 C, 23 C, 108, 17.17, 129.1, 118.1, 137.4; 343/705, 880, 881, 872, 878, 706, 711, 713

[56] References Cited

U.S. PATENT DOCUMENTS

| | | | |
|---|---|---|---|
| 1,833,210 | 11/1931 | Ditter | 244/108 |
| 2,617,934 | 11/1952 | McMillan et al. | 343/705 |
| 2,971,736 | 2/1961 | Enneper | 343/880 |
| 3,241,145 | 3/1966 | Petrides | 343/705 |
| 3,432,120 | 3/1969 | Guerrero | 244/12.2 |
| 3,503,573 | 3/1970 | Modesti | 244/23 C |
| 4,188,631 | 2/1980 | Dougherty et al. | 343/705 |
| 4,380,012 | 4/1983 | Bevan et al. | 343/705 |
| 4,593,288 | 6/1986 | Fitzpatrick | 343/705 |
| 5,150,857 | 9/1992 | Moffitt et al. | 244/12.2 |
| 5,152,478 | 10/1992 | Cycon et al. | 244/12.2 |
| 5,226,350 | 7/1993 | Cycon et al. | 74/665 F |
| 5,277,380 | 1/1994 | Cycon et al. | 244/12.2 |
| 5,281,099 | 1/1994 | Hunter et al. | 416/244 R |
| 5,340,279 | 8/1994 | Cycon et al. | 416/134 |

FOREIGN PATENT DOCUMENTS

| | | | |
|---|---|---|---|
| 157527 | 12/1939 | Germany | 343/705 |
| 4063800 | 2/1992 | Japan | 244/17.17 |
| 897756 | 5/1962 | United Kingdom | 343/705 |

*Primary Examiner*—Galen L. Barefoot
*Attorney, Agent, or Firm*—Terrance J. Radke

[57] ABSTRACT

An unmanned aerial vehicle (UAV) has a toroidal fuselage and a rotor assembly having a pair of counter-rotating rotors secured in fixed coaxial combination with the toroidal fuselage to provide a vertical takeoff and landing (VTOL) capability for the UAV. One embodiment of the VTOL UAV is especially configured for ground surveillance missions by the inclusion of an externally mounted, remotely controllable stowable sensor subsystem that provides an azimuthal scanning capability and a predetermined elevation/depression scanning capability to accomplish the ground surveillance mission and a foldable landing gear subsystem to facilitate landing of the VTOL UAV at unprepared ground surveillance sites.

18 Claims, 6 Drawing Sheets

UNMANNED VTOL GROUND SURVEILLANCE VEHICLE

TECHNICAL FIELD

The present invention relates to unmanned aerial vehicles (UAVs) having a vertical takeoff/landing (VTOL) capability, and more particularly, to a UAV having a toroidal fuselage and a pair of ducted coaxial, counter-rotating rotors that provide a VTOL capability and wherein the UAV is especially configured for ground surveillance missions by the inclusion of an externally mounted, remotely controllable, stowable sensor subsystem and/or a foldable landing gear subsystem.

BACKGROUND OF THE INVENTION

There has been a recent resurgence of interest in the use of unmanned aerial vehicles (UAVs) having an airplane-type configuration and/or a rotor-type configuration for performing a variety of aerial missions where the use of manned flight vehicles is not deemed appropriate, for whatever reason. Such aerial missions include surveillance, reconnaissance, target acquisition and/or designation, data acquisition, communications datalinking, decoy, jamming, harassment, or one-way supply flights. More recently, the suitability and/or capabilities of rotor-type UAVs for ground surveillance missions is being explored.

There are numerous ground surveillance missions where the particular capabilities of rotor-type UAVs make such vehicles particularly well suited for the mission. For example, the VTOL capability of rotor-type UAVs makes them particularly well suited for use where the ground surveillance site is remote, hazardous, and/or inaccessible by other means. In many instances, the requirements of the ground surveillance mission makes the use of a fixed sensor system, e.g., video, acoustic, motion detection, impractical. Further, many type of ground surveillance missions are beyond the practical capabilities of a human observer, e.g., missions that are inherently hazardous or that require surveillance at multiple sites over a short time span.

Some of the various types of ground surveillance missions for which VTOL UAVs are particularly advantageous include border patrol surveillance, news coverage, disaster monitoring, police stakeouts, enviromnental protection monitoring, and geologic/seismic surveillance and/or monitoring. For border patrol surveillance, the VTOL UAV can be remotely piloted to potential border crossing sites where the UAV is landed and shutdown. A sensor package may be automatically and/or remotely operated for covert surveillance of the potential crossing site. Depending upon the particular mission conditions, the sensor package may be configured to provide a multi-spectral surveillance capability. Sensor data can be datalimked to a remote observation facility for real-time assessment and response. For news coverage, a VTOL UAV may be particularly advantageous since the aerial and VTOL capabilities thereof may provide the most expeditious, or even the only practical, means of accessing the ground news site. The VTOL UAV is dispatched to the news site where it is landed, and the sensor package activated to broadcast and/or record video and/or audio footage of the news event. The VTOL UAV has the capability to be readily repositioned for better camera angles, or relocated to another news site upon command. Video and/or audio coverage of widely separated news sites may be readily obtained using a single VTOL UAV without the requirement for numerous fihn crews or transport equipment.

A VTOL UAV may be deployed to remotely monitor disaster sites such as flooding rivers or crumbling bridges/highways/buildings. The VTOL UAV can be remotely landed at disaster sites of interest, and the sensor package activated to provide sensor data to assess the extent of the disaster, to provide an early warning of an exacerbation of the disaster conditions, and/or to survey for possible victims. Once a disaster site has been assessed by means of remotely transmitted data provided by the sensor package, the VTOL UAV may be relocated to another disaster site to provide further disaster data. For police work, a VTOL vehicle may be dispatched to potential/actual crime sites, e.g., stakeouts, crimes in progress, and the sensor package activated to provide covert sensor data of the event. The use of a VTOL UAV for crime site surveillance or monitoring eliminates the need to exposed law enforcement personnel to the inherent dangers of the crime site. A VTOL UAV may be expeditiously deployed to toxic accident sites to provide relevant sensor data, e.g., video, chemical detectors, to allow remote assessment of the extent of damage and/or to formulate a containment/cleanup campaign. The use of a VTOL UAV eliminates the health risks associated with the use of human personnel for such duties. A VTOL UAV may also be utilized to monitor remote sites for illegal dumping of toxic wastes. Volcano sites may be remotely monitored using a VTOL UAV, or the seismic activity along remote fault lines may be monitored. A VTOL UAV may be utilized for seismic mapping in remote, inaccessible areas.

In addition to the utility of VTOL UAVs for the exemplary civilian ground surveillance missions of the types described in the preceding paragraphs, a VTOL UAV also has potential military applications. While matured aerial assets may be utilized for such missions, such applications may be of low priority, and therefore aerial assets may not always be available for such applications. VTOL UAVs, in contrast, may be dedicated for use in low priority military applications. For example, VTOL UAVs may be utilized for missions such as sentry duty or remote reconnaissance missions which may be low priority applications in the overall context of a warfare scenario. In addition, the use of VTOL UAVs eliminates the risk of harm to military personnel, and in many instances, e.g., remote reconnaissance, provides a more expeditious means of accomplishing the mission.

A need exists for a VTOL UAV having the capability to perform remote ground surveillance and/or monitoring missions. The VTOL UAV should be capable of remote pilotage and remote UAV shutdowns/startups to extend mission time and enhance coverness where required. The VTOL UAV should have the capability to accommodate a multi-sensor mission package that may be configured to provide an allweather, multi-spectral surveillance/monitoring capability. The sensor mission package of the VTOL UAV should be configured to provide sensor data that is readily assimilated by personnel at the remote command/control (RCC) facility. The VTOL UAV sensor package should be capable of being readily reconfigured to facilitate the stowage and transportability of the VTOL UAV. The VTOL UAV should be configured to provide the capability of remotely landing the UAV at unprepared ground surveillance sites, and to accommodate diverse types of terrain. The VTOL UAV should have the capability to provide remote landing site assessment data. Further, the VTOL should have the capability to transmit sensor data in real time to the RCC facility.

SUMMARY OF THE INVENTION

One object of the present invention is to provide an unmanned aerial vehicle (UAV) having a toroidal fuselage and a pair of ducted, coaxial counter-rotating rotors that provide a vertical takeoff and landing (VTOL) capability that is especially configured for ground surveillance missions by the inclusion of an externally mounted, remotely controllable, stowable sensor subsystem and/or a foldable gear subsystem.

Another object of the present invention is to provide a sensor subsystem for the VTOL UAV that has an azimuthal scanning capability and a predetermined elevation/depression scanning capability to accomplish the ground surveillance mission.

A further object of the present invention is to provide a sensor subsystem for the VTOL UAV that is reconfigured to a deployed configuration for accomplishment of the ground surveillance mission and reconfigured to a stowed configuration for transportability of the UAV.

These and other objects of the present invention are provided by an unmanned aerial vehicle (UAV) having a toroidal fuselage and a rotor assembly that includes a pair of counter-rotating rotors secured in fixed coaxial combination with the toroidal fuselage to provide a vertical takeoff and landing capability for the UAV. One embodiment of the UAV is especially configured for ground surveillance missions by the inclusion of an externally mounted, remotely controllable, stowable sensor subsystem that provides an azimuthal scanning capability and a predetermined elevation/depression scanning capability to accomplish the ground surveillance mission and a foldable landing gear subsystem to facilitate landing of the UAV at unprepared ground surveillance sites.

The foldable landing gear subsystem includes a plurality of legs, one end of each leg being detachably secured in combination with the toroidal fuselage, a foot that includes a pad member pivotally attached to the other end of each leg, and a non-structural hinge secured to each leg and the toroidal fuselage. The non-structural hinges provide the capability to fold the landing gear subsystem to a stowage configuration wherein each leg, pivoting foot combination is folded within the envelope of the toroidal fuselage.

The stowable sensor subsystem includes a plurality of support struts having one end thereof secured in pivotable combination with the toroidal fuselage, the support struts being pivotable to reconfigure the sensor subsystem to a deployed configuration for accomplishment of the ground surveillance mission and to reconfigure the sensor subsystem to a stowed configuration for transportability thereof, a pod housing having a turntable, and a mounting assembly for mounting the support struts in pivotable combination with the turntable wherein the pod housing is pivotable through a predetermined range to provide the predetermined elevation/depression scanning capability of the sensor subsystem. The turntable is mounted in rotatable combination with the mounting assembly, and an azimuth control device is mounted on the turntable in interactive combination with the mounting assembly and operative to rotate the turntable with respect to the mounting assembly to provide the azimuthal scanning capability for the sensor subsystem. At least one sensor is mounted in combination with the turntable to provide sensor data in accomplishment of the ground surveillance mission.

In an alternative embodiment, at least one sensor is mounted in combination with at least one of the pad members of the pivoting foot to provide additional sensor data in accomplishment of the ground surveillance mission.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES CARRYING OUT THE INVENTION

Figure 1:
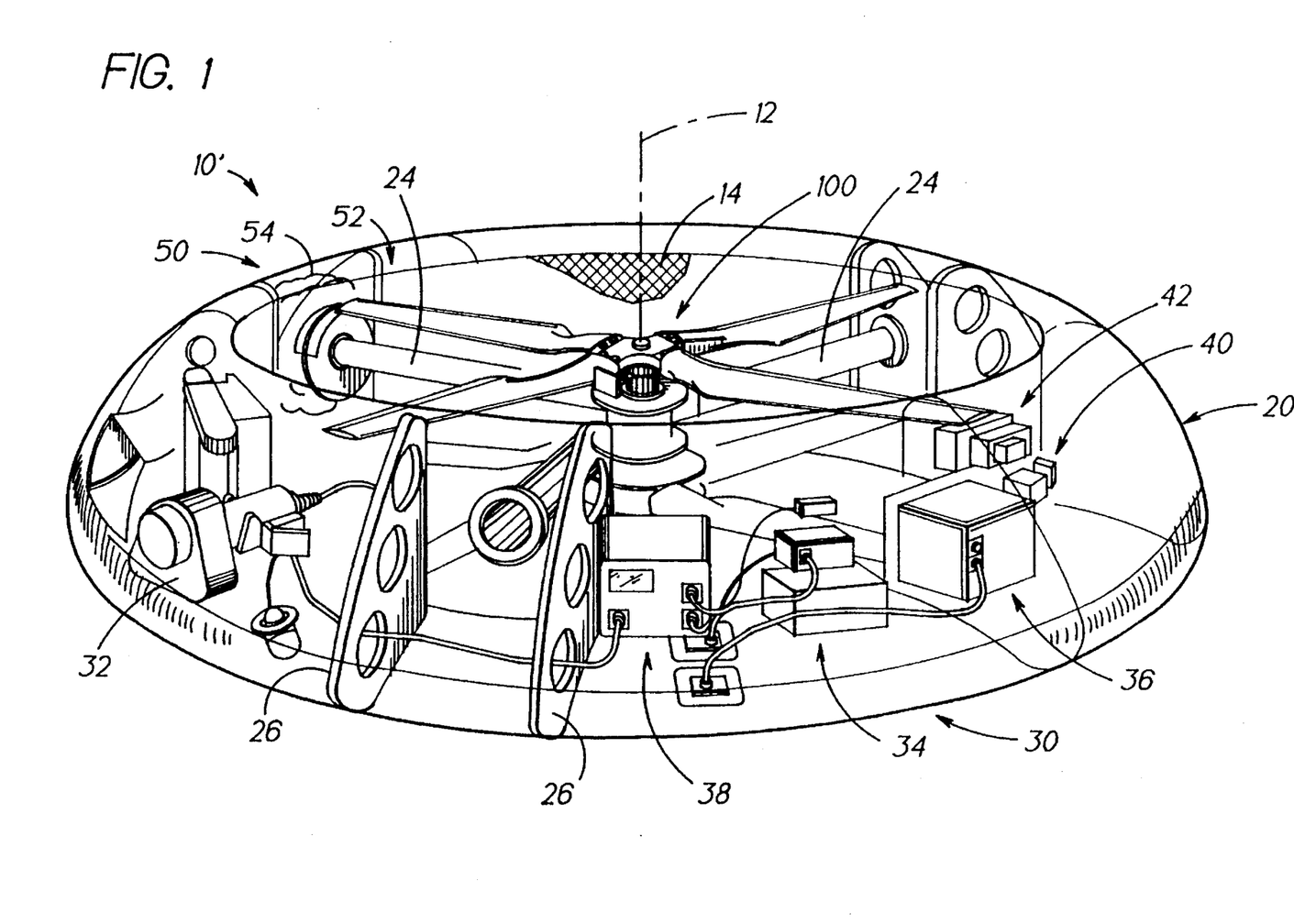
FIG. 1 is a perspective, partially broken away view of one embodiment of an unmanned aerial vehicle (UAV) having a toroidal fuselage and a pair of ducted coaxial, counter-rotating rotors that provide a vertical takeoff/landing (VTOL) capability.

Referring now to the drawings wherein like reference characters identify corresponding or similar elements throughout the several views, FIG. 1 illustrates one embodiment of a CYPHER® (CYPHER is a registered trademark of the Sikorsky Aircraft Corporation, A subsidiary of United Technologies Corporation) unmanned aerial vehicle (UAV) 10' developed by Sikorsky Aircraft. The CYPHER® UAV 10' comprises a toroidal shroud or fuselage 20 and a pair of ducted coaxial, counter-rotating rotors 100 which provide the UAV 10' with a vertical takeoff/landing (VTOL) capability. The toroidal fuselage 20 has an aerodynamic profile 22 (see FIG. 5) which may be aerodynamically optimized to minimize nose-up pitching moments during forward translational flight, as described in further detail in commonly-owned U.S. Pat. No. 5,150,857 entitled SHROUD GEOMETRY FOR UNMANNED AERIAL VEHICLES, or may be hemicylindrical, as described in further detail in commonly-owned U.S. Pat. No. 5,152,487 entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS.

The embodiment of the CYPHER® UAV 10' described herein has a toroidal fuselage 20 diameter of about 1.98 m (6.5 feet), a toroidal fuselage 20 envelope height of about 0.49 m (1.6 feet), an empty vehicle weight of about 79.37 kg (175 pounds), and a gross vehicle weight of about 113.38 kg (250 pounds). Reference numeral 12 illustrated in FIG. 1 defines the fuselage axis of the UAV 10'. The toroidal fuselage 20 has a plurality of hollow support struts 24 (three for the described embodiment) integrally formed with and extending radially outwardly from the inner periphery of the toroidal fuselage 20 to the rotor assembly 100. The support struts are rigidly attached to the rotor assembly 100 and are operative to support the rotor assembly 100 in a fixed coaxial relation with respect to the toroidal fuselage 20, i.e., the rotational axis of the rotor assembly 100 coincides with the fuselage axis 12.

The toroidal fuselage 20 and the plurality of support struts 24 are preferably fabricated from a composite material to provide a high strength structure of minimal weight. The various types of high tensile strength fibrous materials and resins having utility in the formation of aerospace composite structures are well known to those skilled in the art. The toroidal fuselage is fabricated as a closed toroid to provide maximum structural strength. The toroidal fuselage 20 is a partially hollow structure, and fabricated so as to provide a plurality of accessible internal bays 26. One preferred embodiment of the toroidal fuselage 20 of the CYPHER® UAV 10' described herein is disclosed in further detail in commonly-owned U.S. Pat. No. 5,277,380 entitled TOROIDAL FUSELAGE STRUCTURE FOR UNMANNED AERIAL VEHICLES HAVING DUCTED, COAXIAL, COUNTER-ROTATING ROTORS.

The various internal bays 26 are typically utilized for sundry flight/mission equipment 30 as described hereinbelow. The mission payload equipment 32 is preferably located, but not limited to, the internal bay 26 at the 180° azimuthal station (the forward station) of the toroidal fuselage 20. Generally, the mission payload equipment 32 will consist of some type of passive sensor(s), e.g., infrared detector(s), television camera(s), etc., and/or active device(s), e.g., laser(s), radio communication gear, radar, etc., and associated processing gear that provides the GYPHER® UAV 10' with the capability of performing a variety of aerial missions such as surveillance, reconnaissance and/or targeting, and the forward internal bay 26 provides a good field of view for such mission payload equipment 32. Other flight/mission equipment 30 such as avionics 34, navigation equipment 36, flight computer 38, communications gear 40 (for relaying real time sensor data and/or receiving real time command input signals), an internal power supply such as chargeable storage batteries (exemplarily illustrated by reference numeral 42), antennae, etc., are distributed in the various internal bays 26 as exemplarily illustrated in FIG. 1. Distribution of the flight/mission equipment 30 is optimized in conjunction with the placement of the powerplant subsystem 50 for weight and balance considerations for flight operations of the CYPHER® UAV 10'.

The flight computer 38 controls the flight operations, including landings and takeoffs, of the CYPHER® UAV 10'. Preprogrannned flight routines, such as a takeoff routine, a landing routine, a cruise routine, may be stored in the flight computer 38 and automatically implemented by means of remote command signals. The flight computer 38 is also responsive to flight command signals generated by a remote command/control(RCC) facility so that the RCC facility may modify or override any flight routine being executed by the UAV 10'.

The powerplant subsystem 50 includes one or more fuel tank(s)52, an engine 54, and a drive train assembly (not illustrated) for coupling power from the engine 54 to the rotor assembly 100. The drive train assembly includes a drive shaft (not illustrated) which is routed from the engine 54 through one of the hollow support struts 24 to provide power to the rotor assembly 100. The fuel tanks 52 are disposed within appropriate internal bays 26, preferably in opposed equipment bays 26 at the 90°, 270° azimuthal stations (the lateral stations) to maintain a constant center of gravity for the CYPHER® UAV 10' during flight operations. The engine 54 is mounted within an internal bay 26 so as to counterbalance the weight of the fuel tanks 52 and the flight/mission equipment 30. Operation of the engine 54 is controlled and monitored by the flight computer 38. The powerplant subsystem 50 is configured to provide a remote shutdown/restart capability for the engine 54, which is also controlled via the flight computer 38.

The CYPHER® UAV 10' may include an inlet screen 14, disposed as partially illustrated in FIG. 1, to protect the rotor assembly 100 from FOD. The UAV 10' may also include an outlet screen (not illustrated) to similarly protect the rotor assembly 100. Other structural and functional features of the powerplant subsystem 50, the drive train assembly, and the rotor assembly 100, which includes an electronic control servo subsystem, upper and lower stationary swashplate subassemblies, a plurality of pitch control rods, a coaxial transmission/center hub subassembly, upper and lower integrated spline/cone seat subassemblies, and upper and lower, multi-bladed counter rotating rotors, are described in further detail in commonly-owned U.S. Pat. No. 5,281,099 entitled INTEGRATED SPLINE/CONE SEAT SUBASSEMBLY FOR A ROTOR ASSEMBLY HAVING DUCTED, COAXIAL COUNTER-ROTATING ROTORS. Since the foregoing structural and functional features of the UAV 10' are not crucial to an understanding of the present invention, the details thereof have not been included in the present disclosure for brevity.

Figure 2:
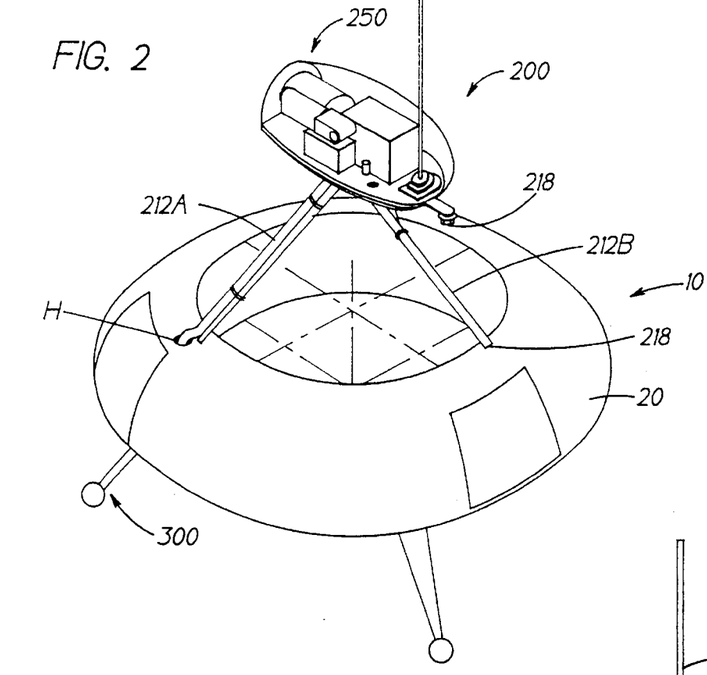
FIG. 2 is a perspective view of a VTOL UAV according to the present invention that includes an externally mounted, remotely controllable sensor subsystem and a landing gear subsystem.

A CYPHER® unmanned aerial vehicle (UAV) 10 according to the present invention is exemplary illustrated in FIG. 2 and generally includes the structural and functional features of the CYPHER® UAV 10' as described in the preceding paragraphs. The UAV 10 according to the present invention is configured for ground surveillance missions of the type described hereinabove. To perform such ground surveillance missions, the UAV 10 includes an externally mounted, remotely controllable sensor subsystem 200 and/or a foldable landing gear subsystem 300, which may be sensored for specific mission applications. Since the UAV 10 according to the present invention includes sensor subsystems specifically designed to perform ground surveillance missions, the UAV 10 according to the present invention will generally not include internally disposed mission payload equipment 32 of the type described hereinabove for the embodiment of the CYPHER® UAV 10' that is configured for aerial missions such as surveillance, reconnaissance, and/or targeting missions, e.g., no internally mounted passive sensors and/or active devices. The internal bays 26 that house such mission payload equipment 32 may be reconfigured to hold equipment associated with the external sensor subsystems of the UAV 10, e.g., data processing equipment, data storage and/or downlinking equipment, etc., supplemental fuel tanks 52 to extend the mission flight profile of the UAV 10, and/or additional chargeable storage batteries 42 to extend the surveillance time of the mission sensor subsystem(s).

The externally mounted, remotely controllable sensor subsystem 200 is configured to provide a remote, multi-field of view sensing capability that includes a 360° azimuthal scanning capability and a 60° elevation/depression scanning capability (±30° pivot range with respect to the plane of a static viewing axis) to accomplish ground surveillance missions. In addition, the sensor subsystem 200 is configured to provide a through-the-rotor assembly 100 viewing capability to provide landing site assessment data, which provides the CYPHER® UAV 10 with a remote relocation capability, i.e., the capability to be remotely piloted, to land at, and to takeoff from unprepared ground surveillance sites. The placement of the sensor subsystem 200, as described hereinbelow in further detail, approximates the visual field of view of a human observer (in terms of height above the ground plane) such that the sensor data is easily assimilated and analyzed at the RCC facility that controls the mission operations of the UAV 10. The sensor subsystem 200 is collapsible to minimize the stowage volume of the UAV 10 to facilitate transportability thereof.

Referring now to FIGS. 2–8, the externally mounted, remotely controllable sensor subsystem 200 includes a mounting assembly 210 and a sensor pod 250. The mounting assembly 210 comprises a plurality of support struts 212 (preferably three support struts 212A, 212A, 212B forming a tripod as illustrated to minimize the overall weight of the mounting assembly 210 while concomitantly providing the required viewing stability for the sensor pod 250), means 214 for mounting the sensor pod 250 in pivotable combination with the tripod support struts 212, an interconnect cable 216, and mounting bearings 218. Each tripod support strut 212 has a mounting bearing 218 secured to the end thereof distal the sensor pod 250 (see FIGS. 2–3). Each mounting bearing 218, in turn, is secured in combination with the toroidal fuselage 20 of the CYPHER® UAV 10 as exemplary illustrated in FIG. 2. The tripod support struts 212 are pivotable about the mounting bearings 218 to permit the sensor subsystem 200 to be folded to a stowage position, as described in further detail hereinbelow, to facilitate premission ground, air, or sea transportability of the UAV 10.

The pivotable mounting means 214 for the described embodiment of the externally mounted, remotely controllable sensor subsystem 200 comprises a platform 220 having a cylindrical mounting stub 222 extending therefrom and a ring of teeth 224 adjacent the periphery thereof, a platform bracket 226, and a linear actuator 228. The platform bracket 226, which has a clevis configuration, is secured in pivotable combination with the mounting stub 222 so that the platform 220 is pivotable with respect to the platform bracket 226 (the pivot axis is identified by reference numeral 230 in FIG. 4). The ends of the tripod support struts 212A distal the mounting bearings 218 are fixedly secured in combination with the platform bracket 226. The end of the support strut 212B distal the mounting bearing 218 is detachably secured in combination with the platform bracket 226 by means of a quick disconnect pin 232.

One end of the linear actuator 228, which in the illustrated embodiment is a jack screw, is secured to the platform 220 by means of a bearing assembly 234 and the other end is detachably secured to the support strut 212B by means of a quick disconnect pin 236. The linear actuator 228 is operable by remote control, i.e., command signals transmitted from the RCC facility, and provides elevation/depression control of the sensor pod 250 by causing the platform 220 to pivot within a predetermined range with respect to the platform bracket 226, i.e., about the pivot axis 230, to elevate/depress the line of sight of the sensors encapsulated in the sensor pod 250. For the described embodiment, the sensor pod 250 may be routinely elevated +30° above the plane of the static viewing axis and depressed −30° below the plane of the static viewing axis as required to accomplish ground surveillance missions, as exemplarily illustrated in FIG. 5 (the deployed landing gear subsystem 300 is omitted from FIG. 5 for simplicity). In addition, the linear actuator 228 is non-routinely operable (typically by means of cormhand signals which are part of the landing routine stored in the flight computer 38) to depress the sensor pod 250 so that the static viewing axis thereof passes through the rotor assembly 100 (reference character LO in FIG. 5 identifies the sensor pod 250 in the landing orientation). In this orientation, the sensor pod 250 provides sensor data for remote assessment of the suitability of a selected ground surveillance landing site as the CYPHER® UAV 10 initiates a landing sequence. Command signals, either remotely transmitted from the RCC facility or as part of a mission computer routine, cause extension/retraction of the linear actuator 228 which causes the platform 220 to pivot with respect to the platform bracket 226, i.e., about the pivot axis 230, to elevate/depress the static viewing axis of the sensor pod 250, i.e., elevate/depress the line of sight of the sensors encapsulated in the sensor pod 250.

The interconnect cable 216 of the described embodiment of the CYPHER® UAV 10 is operative to couple power and/or cormmand signals to the sensor pod 250 from the UAV 10 and/or to transmit sensor data from the sensor pod 250 to associated processing equipment stored in an internal equipment bay 26 of the UAV 10. While the sensor pod 250 may be configured to be self-sufficient with respect to power, command signals, and sensor data processing, the overall dimensions and weight associated with a self-sufficient sensor pod are commensurately increased, which may adversely impact the weight and balance and center of gravity parameters of the UAV 10. The use of the interconnect cable 216, which allows the power source 42, command signal transceiver 40, and/or associated data processing equipment for the sensor pod 250 to be housed internally within the toroidal fuselage 20 of the UAV 10, is a more pragmatic approach that simplifies the weight and balance and center of gravity considerations for the UAV 10. The interconnect cable 216 is secured in combination with one of the support struts 212A by means of mounting clips 238. One end of the cable 216 passes through a hole H (see FIG. 2) in the toroidal fuselage 20 and is connected to the internal power supply 42, communications gear 40 and/or the associated data processing/storage equipment for the sensor pod 250, as required. The other end of the cable 216 is inserted into the sensor pod 250 to facilitate connection with the appropriate components of the sensor subsystem 200 as described herein. The cable 216 has a predetermined coiled configuration (see reference numeral 216C in FIG. 4) that provides the necessary slack in the cable 216 so that the sensor pod 250 may be rotated through 360° azimuthally, as described in further detail hereinbelow.

Figure 3:
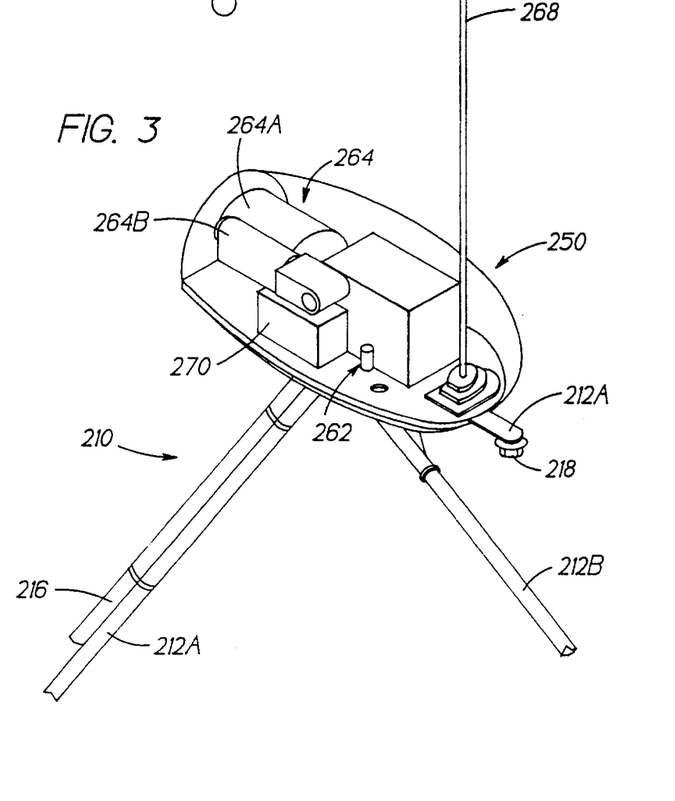
FIG. 3 is a partial perspective view of the externally mounted, remotely controllable sensor subsystem of FIG. 2.
Figure 4:
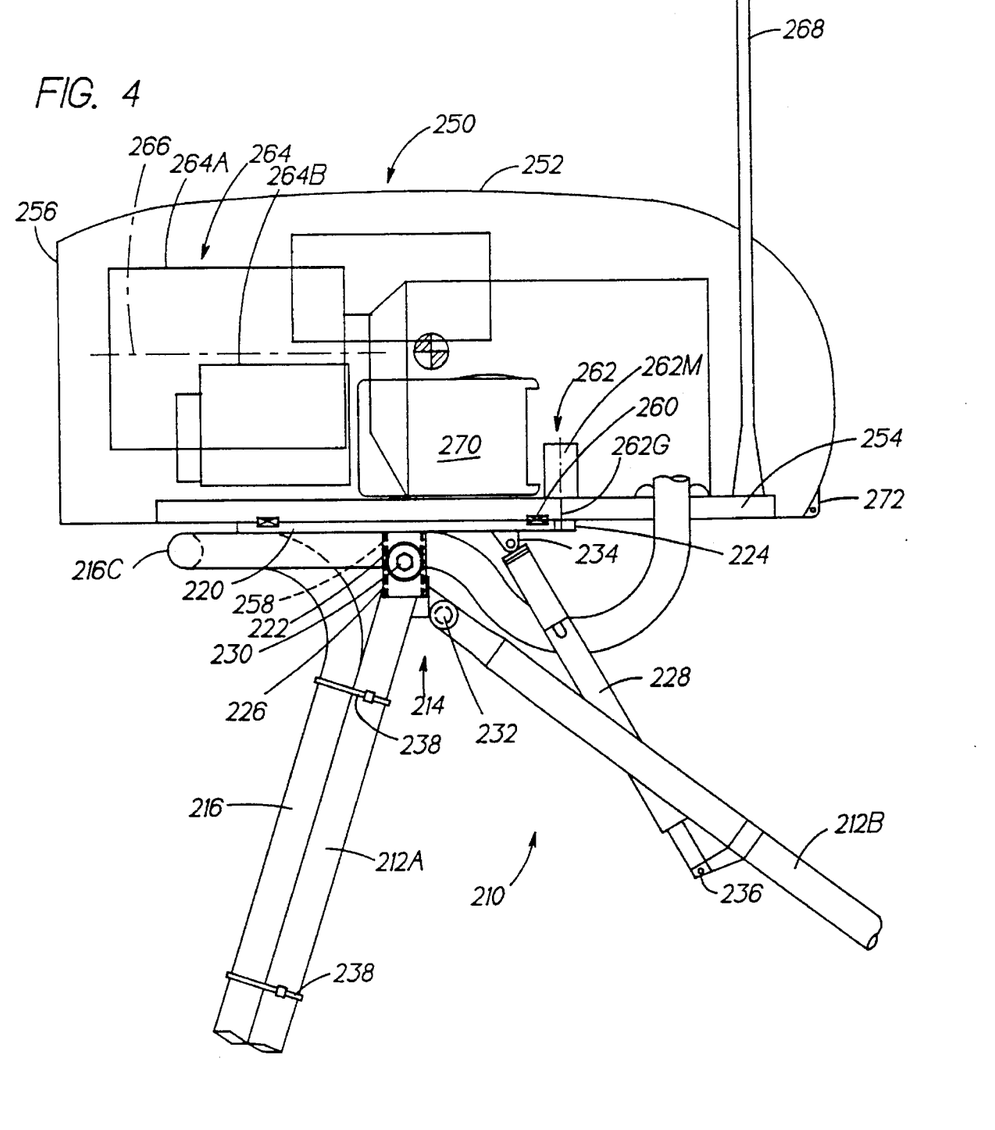
FIG. 4 is a partial sectional view of the externally mounted, remotely controllable sensor subsystem of FIG. 3.

Referring to FIGS. 3–4, the sensor pod 250 comprises a pod housing 252 that includes a turntable 254 and an open end wall 256. The turntable 254 has a cylindrical stub 258 projecting therefrom that is inserted in the cylindrical mounting stub 222 of the platform 220 to mount the turntable 254 in combination with the platform 220. As a result, the turntable 254, and concomitantly the sensor pod 250, is elevated/depressed in synchronization with elevation/depression of the platform 220 as described hereinabove. An annular bearing 260 is disposed intermediate to the turntable 254 and the platform 220 so that the turntable 254 is rotatable with respect to the platform 220 (the cylindrical stub 258 is freely rotatably within the cylindrical mounting stub 222).

Mounted on the turntable 254 within the pod housing 252 is an azimuth control means 262 which is remotely operable to control the azimuthal orientation of the sensor pod 250 with respect to the platform 220. For the illustrated embodiment of the CYPHER® UAV 10, the azimuth control means 262 comprises an electric motor 262M that drives a pinion gear 262G. Command signals (transmitted by the RCC facility or as part of a mission software routine) actuate the electric motor 262M to drive the pinion gear 262G, the pinion gear 262G interacting with the teeth 224 of the platform 220 to cause rotation of the turntable 254 relative to the platform 220 to change the azimuthal orientation of the static viewing axis of the sensor pod 250.

Also mounted on the turntable 254 are one or more sensors 264. The types of sensors 264 included in the sensor pod 250 are typically such as to provide the CYPHER® UAV 10 with an all-weather, multi-spectral surveillance and/or monitoring capability. For example, the embodiment of the UAV 10 described herein includes a forward looking infrared (FLIR) system 264A and a low light television (LLTV) system 264B. One skilled in the art will appreciate that the type and/or number of sensors 264 mounted within the sensor pod 250 will depend primarily on the objectives of and the environmental conditions affecting the ground surveillance mission to be accomplished by the UAV 10. For example, the FLIR system 264A would be appropriate for a nighttime border surveillance mission, but may not be necessary for a daytime border surveillance mission, while the LLTV system 264B would be appropriate for daylight surveillance missions, especially under low lighting conditions, e.g., heavy cloud cover. The open end wall 256 of the pod housing 252 facilitates interception and/or broadcast of electromagnetic radiation by the sensors 264, e.g., visual, infrared, etc. Alternatively, the end wall may be closed, in which case the closed end wall is fabricated from a material that is transparent to the frequency spectra of electromagnetic radiation intercepted/broadcast by the sensors 264, e.g., visual, infrared.

Figure 5:
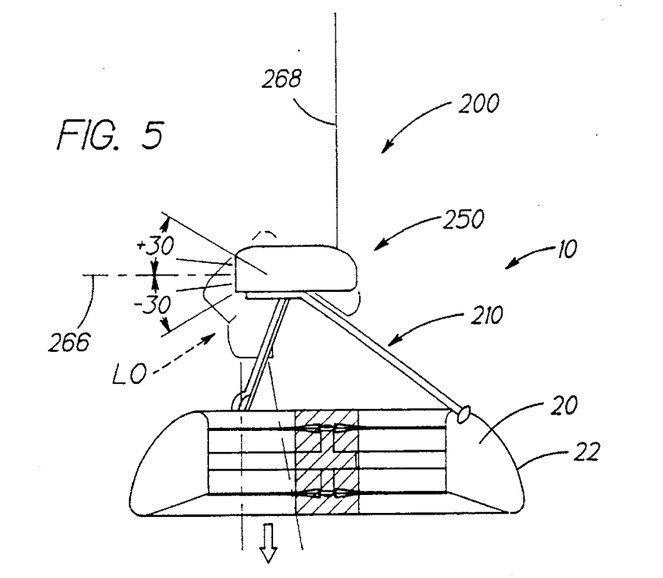
FIG. 5 illustrates the elevation/depression scan capability of the externally mounted, remotely controllable sensor subsystem of FIG. 2.

Reference numeral 266 in FIGS. 4–5 defines the static viewing axis for the sensor pod 250, i.e., the approximate centerline of the field of view of the sensors 264 mounted within the sensor pod 250. With the externally mounted, remotely controllable sensor subsystem 200 and the toldable landing gear subsystem 300 in a deployed configuration (see FIG. 2), the static viewing axis 266 is approximately horizontal to the ground plane at a height thereabove that coincides with the visual viewing axis of a typical human observer so that sensor data provided by the sensors 264 may be easily assimilated by personnel in the RCC facility. The baseline reference position of the static viewing axis 266 coincides with the 180° azimuthal station of the CYPHER® UAV 10 (see FIG. 5). Elevation/depression and/or rotation of the turntable 254 may be referenced to the orientation of the new position of the static viewing axis 266 versus the baseline reference position.

A non-line-of-sight (NLOS) antenna 268 may be mounted on the turntable 254 in interconnected combination with the interconnect cable 216, the linear actuator 228, the azimuth control means 262, and/or the sensors 264, as required. The NLOS antenna 268 enhances the capability of the CYPHER® UAV 10 to receive command signals from the RCC facility when the UAV 10 is preparing to land or has alit at a ground surveillance site that is out of the direct line-of-sight of the RCC facility.

A pod orientation means 270 may also mounted on the turntable 254. The pod orientation means 270 is operative to provide spatial orientation data on the turntable 254 so that the ground surveillance data provided by the sensors 264 encapsulated within the sensor pod 250 may be properly orientated by the remote user, e.g., with a grid or topographical map. For example, the pod orientation means 270 would preferably include an electronic inclinometer to provide absolute (or relative) elevation/depression spatial orientation data for the turntable 254 (with respect to the baseline reference plane of the static viewing axis 266) and an electronic compass to provide absolute (or relative) azimuthal spatial orientation data for the turntable 254 (with respect to the baseline reference position of the static viewing axis 266).

The pod housing 252 further includes a stowage bracket 272 secured thereto at the end distal the transparent end wall 256 (see FIG. 4) that is used to secure the pod housing 252 in the stowed configuration. The externally mounted, remotely controllable sensor subsystem 200 also includes first and second stowage brackets 280, 282 (see FIG. 7B) that are secured in combination with the toroidal fuselage 20. The first stowage bracket 280 is configured to interact with the stowage bracket 272 to secure the pod housing 252 in the stowed configuration. The second stowage bracket 282 is configured to secure the aft support strut 212B in the stowed configuration.

Figure 6:
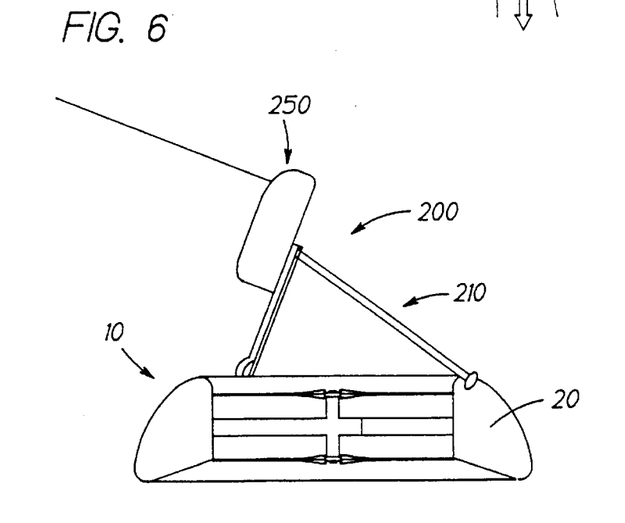
FIG. 6 depicts the initial step in the stowage sequence for the externally mounted, remotely controllable sensor subsystem of FIG. 2.
Figure 7A:
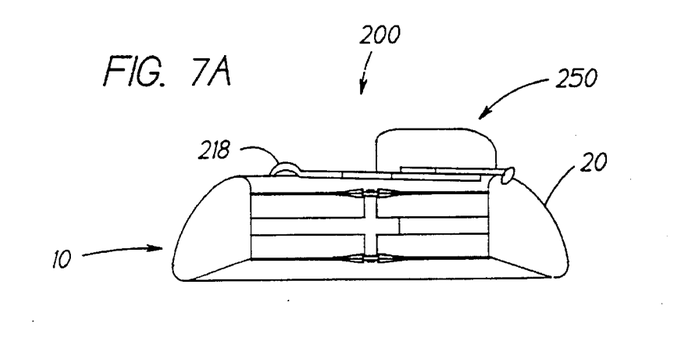
FIG. 7A is a side plan view illustrating the externally mounted, remotely controllable sensor subsystem of FIG. 2 in the stowed configuration.
Figure 7B:
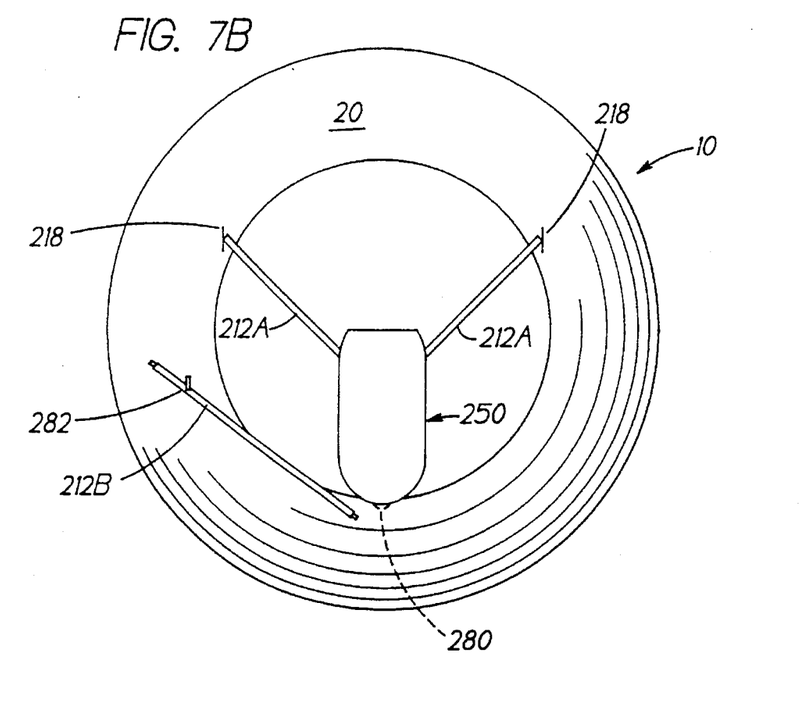
FIG. 7B is a top plan view of the stowage configuration illustrated in FIG. 7A.

The deployed configuration of the externally mounted, remotely controllable sensor subsystem 200 is illustrated in FIGS. 2, 5. To reconfigure the sensor subsystem 200 to the stowed configuration, the sensor pod 250 is rotated to align the static viewing axis 266 thereof with the 180° azimuthal station of the CYPHER® UAV 10, if required, and the sensor pod 250 is then pivoted downwardly to the stowage position illustrated in FIG. 6 (the landing gear subsystem 300 has been omitted from FIG. 6 for simplicity). The quick disconnect pin 236 is then manually removed to disconnect the linear actuator 228 from the aft support strut 212B. Next, the quick disconnect pin 232 is manually removed to disconnect the aft support strut 212B from the platform bracket 226. The aft support strut 212B is then rotated about the bearing assembly 218 so that the aft support strut 212B can be secured in combination with the second stowage bracket 282 (see FIG. 7B). Finally, the sensor pod 250 is manually rotated aftwardly (the support struts 212A rotate about the respective bearing assemblies 218) until the stowage bracket 272 of the pod housing 252 is engaged in combination with the first stowage bracket 280. The engaged brackets 272,280 are pinned to secure the sensor pod 250 in combination with the UAV 10. FIGS. 7A, 7B illustrate the externally mounted, remotely controllable sensor subsystem 200 in the stowed configuration. To deploy the sensor subsystem 200 for a ground surveillance mission, the foregoing steps are performed in reverse order.

Figure 8:
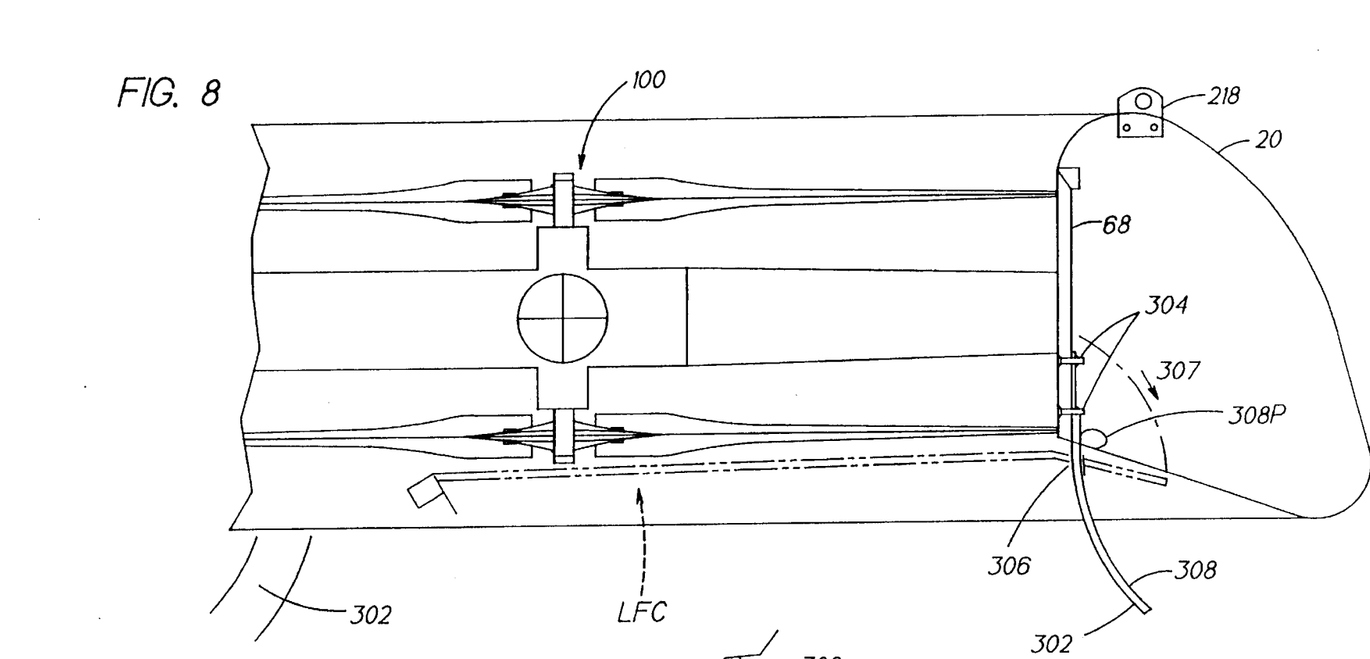
FIG. 8 is a partial cross-sectional view of the VTOL UAV of FIG. 2 illustrating a portion of the landing gear subsystem.
Figure 9:
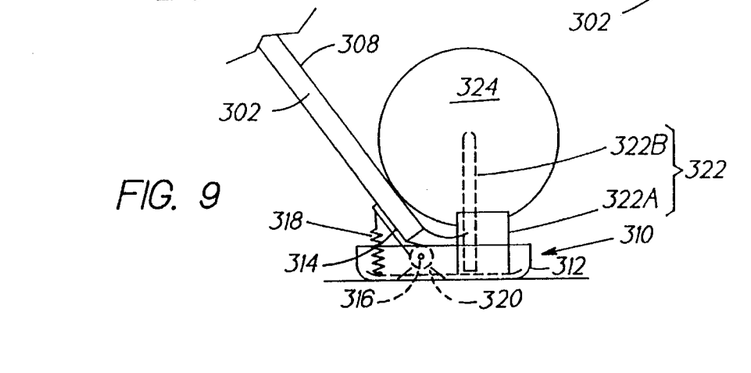
FIG. 9 is a plan perspective view of an exemplary landing gear foot for the landing gear subsystem illustrated in FIG. 2.
Figure 10:
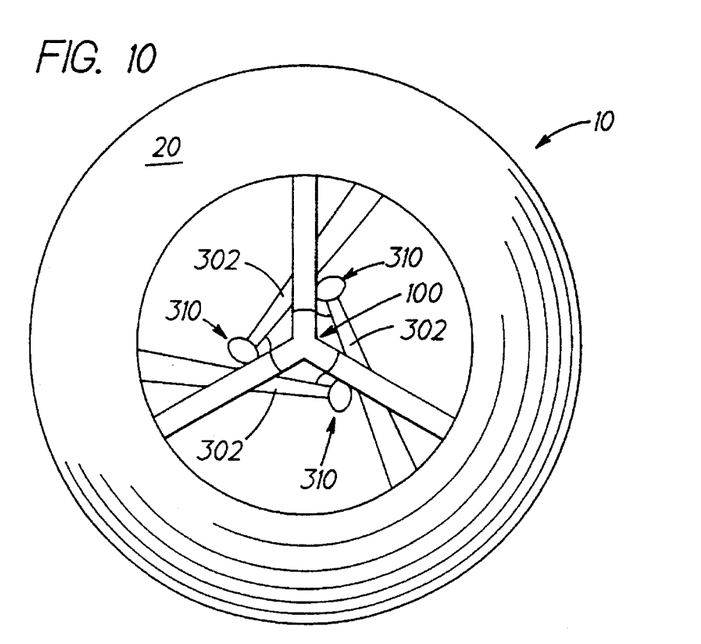
FIG. 10 is a top plan view of the VTOL UAV illustrating the legs of the foldable landing gear subsystem in the stowed configuration.

An exemplary embodiment of the foldable landing gear subsystem 300 for the CYPHER® UAV 10 is illustrated generally in FIG. 2 and in further detail in FIGS. 8–10. The landing gear subsystem 300 is configured to provide the UAV 10 with a remote landing/takeoff capability at unprepared surveillance landing sites. The configuration of the landing gear subsystem 300 described herein provides the UAV 10 with an expanded capability for unprepared landing sites having different soil consistencies, as well as providing the capability to effectuate landings on sloped terrain, which for the described embodiment includes landing sites having a terrain slope of up to 30°. In addition, the landing gear subsystem 300 is configured for foldability to facilitate the transportability of the UAV 10. Further, depending upon the nature of the ground surveillance mission, the landing gear subsystem 300 may be configured with additional sensor devices of the type that are most effectively operated adjacent to the ground plane comprising the landing site.

The landing gear subsystem 300 comprises a plurality of legs 302, each leg 302 having a pivoting foot 310 attached thereto. The described embodiment has three legs 302, which provide the necessary stability for the UAV 10 on the ground. Although the landing gear subsystem 300 could comprise more than three legs 302, the stowage configuration of the legs 302 in the folded condition, as well as the overall increase in subsystem weight, generally militate against a landing gear subsystem having more than three legs.

Each leg 302 is fabricated as a single structural member that has a predetermined resiliency, i.e., a spring-style leg 302. The spring-style leg 302 configuration minimizes landing effects on the CYPHER® UAV 10, and in addition, such legs 302 will automatically provide a certain degree of compensation, i.e., by differential bending among the legs 302, where the unprepared landing site comprises uneven, rough terrain. Each leg 302 is fabricated with an outward cant (see FIG. 8) to enhance the sloped terrain landing capability of the UAV 10 and to minimize the effects of rotor downwash generated by operation of the rotor assembly 100 of the UAV 10 on the deployed legs 302 and the pivoting feet 310 attached thereto. One end portion of each leg 302 is detachably mounted in combination with a respective internal stiffening structure 68 within the toroidal fuselage 20 by means of captive attachment bolts 304 (see FIG. 8). The internal stiffening structures 68 are described in further detail in U.S. Pat. No. 5,277,380 entitled TOROIDAL FUSELAGE STRUCTURE FOR UNMANNED AERIAL VEHICLES HAVING DUCTED, COAXIAL, COUNTER-ROTATING ROTORS (see particularly FIGS. 3, 4b thereof).

Secured to each leg 302 and the internal stiffening structure 68 is a non-structural hinge 306. The non-structural hinges 306, which are non-load bearing with the legs 302 in the deployed configuration (see FIG. 2), are operative to provide the leg-folding capability for the landing gear subsystem 300. Due to the required length of the legs 302 to achieve the desired height of the static viewing axis 266 above the plane of the ground surveillance site, the orientation axis of each hinge 306 is canted to accommodate folding of all of the legs 302 within the envelope of the toroidal fuselage 20, i.e., the stowage configuration as illustrated in FIG. 10 (the UAV 10 illustrated in FIG. 10 does not include the externally mounted, remotely controllable sensor subsystem 200 in order to provide a clear view of the stowage configuration of the legs 302). To deploy the legs 302 to the flight profile configuration, the foregoing steps are performed in reverse order.

To reconfigure the legs 302 to the stowage configuration, the CYPHER® UAV 10 is supported, e.g., by means of a hoist or sling, so that the deployed legs 302 do not touch the ground. The captive attachment bolts 304 of each leg 302 are disengaged to free the upper end of the respective leg 302. The free end of each leg 302 is then pivoted (see reference numeral 307 in FIG. 8) with respect to the nonstructural hinge 306 to fold each leg 302 within the envelope of the toroidal fuselage 20. The non-structural hinge 306 has sufficient mechanical strength in the folded position to retain the corresponding leg 302 in the folded configuration (reference character LFC in FIG. 8 identifies the folded configuration of the leg 302).

A secondary cable 308 may be secured in combination with each leg 302 of landing gear subsystems 300 that include one or more sensor devices mounted in combination with the pivoting foot 310. The secondary cable 308 provides the electrical interface between flight/mission equipment 30 mounted in the internal equipment bay(s) 26 of the UAV 10 and each sensor device mounted in combination with the pivoting foot 310. Each secondary cable 308 has a pigtail configuration 308P that accommodates movement of the corresponding leg 302 between the deployed configuration and the stowed configuration. The pigtail configuration 308P eliminates the need to use electrical connectors in conjunction with the secondary cables to accommodate folding/deployment of the respective legs 302.

The pivoting foot 310 is depicted in FIG. 9 and comprises a pad member 312, a brace member 314, a bearing assembly 316, and a shock absorber spring 318. The pad members 312 are configured, in combination, to support the CYPHER® UAV 10 in a stabilized orientation on the unprepared ground surveillance site. The brace member 314 is secured in combination with the leg 302, and the pad member 312 is mounted in pivotable combination with the brace member 314 by means of the bearing assembly 316. The spring 318 is secured in combination with the pad member 312 and the brace member 314 and is operative to allow the pad member 312 to pivot during the landing of the CYPHER® UAV 10 to accommodate terrain variations in unprepared landing sites. The spring member 318 illustrated in FIG. 6 is in tension, and when the UAV 10 takes off, the spring force of the spring member 318 causes the pad member 312 to pivot about the bearing assembly 316 (clockwise as illustrated in FIG. 6).

Mounted in combination with the pad member 312 intermediate the pad member 312 and the bearing assembly 316 is a weight-on-wheels (WOW) sensor 320. e.g., a proximity sensor or switch. The WOW sensor 320 is operative in combination with the Inertial Navigation System 32 of the CYPHER® UAV 10 to automatically determine the suitability of the selected unprepared landing site. If the site is determined to be unsuitable, e.g., terrain slope greater than 30°, a command signal is sent to the flight computer 38, which issues command signals causing the CYPHER® UAV 10 to abort the preprogrammed landing routine and to climb to a hold flight level to await further instructions.

As noted above, one or more sensor devices 322 may be mounted in combination with the pad member 312 of the pivoting foot 310, depending upon the requirements of the ground surveillance mission. Typically, the sensor device(s) 322 mounted in combination with the pad member 312 are of a type whose operation is enhanced/most effective by being positioned adjacent the ground plane comprising the unprepared ground surveillance site. As exemplary illustrated in FIG. 9, the sensor devices 322 may include a seismic sensor 322A and an acoustic sensor 322B, such sensor devices 322 being particularly apropos for geologic/seismic or security ground surveillance missions. Mounting the seismic sensor 322A in combination with the pad member 312 provides the most efficacious operation of the seismic sensor 322A since tremors/vibrations in the ground surveillance site would be initially coupled into the pivoting foot 310. Similarly, the acoustic sensor 322B is most effectively operated adjacent the ground plane since the adverse effects of environmental winds are less severe adjacent the ground, and hence, interfere less with the operation of the acoustic sensor 322B. If an acoustic sensor 322B is included as part of the mission package, a windscreen 324 is preferably secured in combination with the pad member 3 12 to block surface winds which may adversely affect the operation of the acoustic sensor 322B. Operation of the sensor devices 322 can be remotely controlled by command signals (transmitted by the RCC facility or as part of a preprogrammed mission software routine) coupled through the secondary cable 308. Likewise, data gathered by the sensor devices 322 can be coupled into the sensor pod 250 and/or the UAV 10 for data storage and/or real time transmission to the RCC facility.

For a typical ground surveillance mission, the CYPHER® UAV 10, with the externally mounted, remotely controllable sensor subsystem 200 and the foldable landing gear subsystem 300 in the stowed configuration, is transported to a launch site, which may be unprepared, as close as deemed appropriate to the unprepared ground surveillance site by means of a transporter, e.g., a tractor trailer rig (the transporter may serve as the RCC facility during the UAV 10 mission). Once at the launch site, the UAV 10 is suspended by means of a hoist or sling and the landing gear subsystem 300 is reconfigured from the stowed configuration to the deployed configuration. The UAV 10 is then placed on the ground and the externally mounted, remotely controllable sensor subsystem 200 reconfigured from the stowed configuration to the deployed configuration. After systems checkouts, a command signal from the RCC facility initiates the takeoff sequence (engine 54 startup, lift off to hover).

The CYPHER® UAV 10 may be manually directed to a selected ground surveillance landing site by means of transmitted command signals (or alternatively by means of a Preprogrammed mission flight profile stored in the flight computer 38). When the UAV 10 is at the selected, unprepared ground surveillance landing site, the landing routine, which includes pivoting the sensor pod 250 to look through the rotor assembly 100 to provide landing site assessment data during landing, is initiated. Once the UAV 10 is landed, the engine 54 is shutdown and the surveillance mission initiated. The sensor pod 250 and/or the sensor device(s) 322 may be operated by means of a software program and/or by real time command signals. Gathered data may be stored in the associated processing equipment of the UAV 10 and/or transmitted real time to the RCC facility. The UAV 10 may be relocated to secondary, tertiary, etc., ground surveillance sites by remotely commanding engine 54 startup and the takeoff routine. After completion of the ground surveillance mission, the UAV 10 is recovered at the RCC facility where the externally mounted, remotely controllable sensor subsystem 200 and the foldable landing gear subsystem 300 are reconfigured from the deployed configuration to stowed configuration so that the UAV 10 can be reloaded on the transporter.

A variety of modifications and variations of the present invention are possible in light of the above teachings. For example, depending upon the requirements of ground surveillance mission, the CYPHER® UAV 10 may include the externally controllable, remotely controllable sensor subsystem 200 and the foldable landing gear subsystem 300 with one or more sensor devices 322 mounted in combination with the pivoting foot 310. Alternatively, the CYPHER® UAV 10 may include the externally controllable, remotely controllable sensor subsystem 200 and the foldable landing gear subsystem 300 without any sensor devices mounted in combination with the pivoting toot 310. In yet another alternative, the CYPHER® UAV 10 may include only the foldable landing gear subsystem 300 with one or more sensor devices 322 mounted in combination with the pivoting foot 310. It is therefore to be understood that, within the scope of the appended claims, the present invention may be practiced otherwise than as specifically described hereinabove.

What is claimed is:

1. An unmanned aerial vehicle for a ground surveillance mission, comprising:

a toroidal fuselage;

a rotor assembly including a pair of counter-rotating rotors, said rotor assembly being secured in fixed coaxial combination with said toroidal fuselage and operative to provide lift, pitch, yaw, and roll control to provide vertical takeoff and landing and translational flight capabilities for said unmanned aerial vehicle a landing gear subsystem secured in combination with said toroidal fuselage to facilitate landing of said unmanned aerial vehicle at unprepared ground surveillance sites; and a sensor subsystem that provides an azimuthal scanning capability and a predetermined elevation/depression scanning capability to accomplish the ground surveillance mission, said sensor subsystem including a sensor pod having at least one sensor mounted therein which is operable to provide sensor data in accomplishment of the ground surveillance mission, and a mounting assembly for mounting said sensor pod in external combination with said toroidal fuselage, said mounting assembly being operative to reconfigure said sensor subsystem to a deployed configuration for accomplishment of the ground surveillance mission and to reconfigure said sensor subsystem to a stowed configuration for transportability of said unmanned aerial vehicle.

2. The unmanned aerial vehicle of claim 1 wherein said mounting assembly comprises:

a plurality of mounting bearings secured in combination with said toroidal fuselage;

a plurality of support struts, each support strut having one end thereof secured in pivotable combination with a corresponding one of said mounting bearings; and means for mounting said plurality of support struts in pivotable combination with said sensor pod wherein said sensor pod is pivotable through a predetermined range to provide the predetermined elevation/depression scanning capability for the sensor subsystem;

said support struts being pivotable about said respective mounting bearings to reconfigure said sensor subsystem to said deployed configuration for accomplishment of the ground surveillance mission and to reconfigure said sensor subsystem to said stowed configuration for transportability of said unmanned aerial vehicle.

3. The unharmed aerial vehicle of claim 2 wherein said mounting means comprises:

a platform having a cylindrical mounting stub extending therefrom, said sensor pod being mounted in combination with said platform;

a platform bracket secured in pivotable combination with said cylindrical mounting stub, and wherein the other end of one of said support struts is detachably secured in combination with said platform bracket and the other end of each of said remaining support struts is fixedly secured in combination with said platform bracket; and a linear actuator having one end thereof secured in combination with said platform and the other end detachably secured in combination with said one support strut, said linear actuator being operable to cause said platform to pivot within said predetermined range to provide the predetermined elevation/depression scanning capability for the sensor subsystem.

4. The unmanned aerial vehicle of claim 3 wherein said sensor pod comprises:
- a pod housing including a turntable, said turntable being mounted in rotatable combination with said platform such that said pod housing pivots in synchronization with said platform; and
- azimuth control means mounted on said turntable in interactive combination with said platform for rotating said turntable with respect to said platform to provide said azimuthal scanning capability for said sensor pod;
- said at least one sensor being mounted in combination with said turntable.

5. The unmanned aerial vehicle of claim 4 wherein said sensor pod further comprises pod orientation means for providing elevation/depression and azimuthal spatial orientation data for said sensor pod.

6. The unmanned aerial vehicle of claim 4 wherein said sensor pod further comprises a non-line-of-sight antenna mounted in combination with said turntable.

7. The unmanned aerial vehicle of claim 4 further comprising:
- a stowage bracket secured in combination with said pod housing; and
- a first stowage bracket secured in combination with said toroidal fuselage;
- wherein, with said sensor subsystem in the stowed configuration, said stowage bracket interacts with said first stowage bracket to secure said pod housing to said toroidal fuselage.

8. The unmanned aerial vehicle of claim 4 further comprising:
- an interconnect cable for functionally interconnecting said sensor pod to said toroidal fuselage; and
- mounting clips for securing said interconnect cable in secured combination with one of said plurality of support struts;
- said interconnect cable having a predetermined coil configuration that facilitates azimuthal rotation of said turntable.

9. The unmanned aerial vehicle of claim 3 further comprising:
- a second stowage bracket secured in combination with said toroidal fuselage, said second stowage bracket interacting with said one of said support struts with said sensor subsystem in the stowed configuration to secure said support strut in combination with said toroidal fuselage.

10. The unmanned aerial vehicle of claim 1 wherein said landing gear subsystem comprises:
- a plurality of legs, one end of each said leg being detachably secured in combination with said toroidal fuselage;
- a pivoting foot that includes a pad member for each of said plurality of legs; and
- means for attaching each said pivoting foot in combination with a respective one of said plurality of legs, said pivoting feet facilitating landing of said unmanned aerial vehicle at unprepared ground surveillance sites.

11. The unmanned aerial vehicle of claim 10 further comprising a non-structural hinge secured to each said leg and said toroidal fuselage, said non-structural hinges providing the capability to fold said landing gear subsystem to a stowage configuration wherein each said leg, pivoting foot combination is folded within the envelope of said toroidal fuselage.

12. The unharmed aerial vehicle of claim 10 wherein each of said legs is fabricated as a unitary resilient structural member having an outward can't to minimize the effects of rotor down wash generated by operation of said rotor assembly.

13. The unmanned aerial vehicle of claim 10 wherein said pivoting foot attaching means comprises:
- a brace member secured in combination with said leg;
- a bearing member for mounting each said pad member in pivotable combination with said respective brace member; and
- a shock absorber spring mounted in combination with each said pad member and said respective brace member;
- said shock absorber spring being operative to allow said pad member to pivot during landing of said unmanned aerial vehicle to accommodate terrain variations in unprepared ground surveillance sites.

14. The unmanned aerial vehicle of claim 13 wherein said landing gear subsystem further comprises a weight-on-wheels sensor interposed in combination between said pad member and said respective bearing assembly and operative to facilitate a determination of the suitability of a selected unprepared ground surveillance site.

15. The unmanned aerial vehicle of claim 13 wherein said landing gear subsystem further comprises:
- at least one sensor mounted in combination with at least one of said pad members; and
- a secondary cable operative to functionally interconnect each said at least one sensor with said toroidal fuselage, said secondary cable being secured in combination with said leg of said at least one pad member having said at least one sensor mounted in combination therewith.

16. An unmanned aerial vehicle for a ground surveillance mission, comprising:
- a toroidal fuselage;
- a rotor assembly including a pair of counter-rotating rotors, said rotor assembly being secured in fixed coaxial combination with said toroidal fuselage to provide a vertical takeoff and landing capability for said unmanned aerial vehicle; and
- a landing gear subsystem to facilitate landing of said unmanned aerial vehicle at unprepared ground surveillance sites, said landing gear subsystem including
  - a plurality of legs, one end of each said leg being detachably secured in combination with said toroidal fuselage,
  - a pivoting foot that includes a pad member for each of said plurality of legs,
  - means for attaching each said pivoting foot in combination with a respective one of said plurality of legs, said pivoting feet facilitating landing of said unmanned aerial vehicle at unprepared ground surveillance sites,
  - a non-structural hinge secured to each said leg and said toroidal fuselage, said non-structural hinges providing the capability to fold said landing gear subsystem to a stowage configuration wherein each said leg, pivoting foot combination is folded within the envelope of said toroidal fuselage, and
  - at least one sensor mounted in combination with at least one of said pad members, said at least one sensor being operative to provide sensor data in accomplishment of the ground surveillance mission.

17. An unmanned aerial vehicle for a ground surveillance mission, comprising:

a toroidal fuselage;

a rotor assembly including a pair of counter-rotating rotors, said rotor assembly being secured in fixed coaxial combination with said toroidal fuselage to provide a vertical takeoff and landing capability for said unmanned aerial vehicle;

a landing gear subsystem to facilitate landing of said unmanned aerial vehicle at unprepared ground surveillance sites, said landing gear subsystem including a plurality of legs, one end of each said leg being detachably secured in combination with said toroidal fuselage, a pivoting foot that includes a pad member for each of said plurality of legs, means for attaching each said pivoting foot in combination with a respective one of said plurality of legs, said pivoting feet facilitating landing of said unmanned aerial vehicle at unprepared ground surveillance sites, and a non-structural hinge secured to each said leg and said toroidal fuselage, said non-structural hinges providing the capability to fold said landing gear subsystem to a stowage configuration wherein each said leg, pivoting foot combination is folded within the envelope of said toroidal fuselage; and a sensor subsystem that provides an azimuthal scanning capability and a predetermined elevation/depression scanning capability to accomplish the ground surveillance mission, said sensor subsystem including a plurality of support struts, each support strut having one end thereof secured in pivotable combination with said toroidal fuselage, said supports struts being pivotable with respect to said toroidal fuselage to reconfigure said sensor subsystem to a deployed configuration for accomplishment of the ground surveillance mission and to reconfigure said sensor subsystem to a stowed configuration for transportability of said unmanned aerial vehicle a pod housing including a turntable, means for mounting said plurality of support struts in pivotable combination with said pod housing wherein said pod housing is pivotable through a predetermined range to provide the predetermined elevation/depression scanning capability of said sensor subsystem, said turntable being mounted in rotatable combination with said mounting means, azimuth control means mounted on said turntable in interactive combination with said mounting means for rotating said turntable with respect thereto to provide the azimuthal scanning capability for said sensor subsystem, and at least one sensor mounted in combination with said turntable to provide sensor data in accomplishment of the ground surveillance mission.

18. The unmanned aerial vehicle of claim 17 further comprising at least one sensor mounted in combination with at least one of said pad members, said at least one sensor being operative to provide sensor data in accomplishment of the ground surveillance mission.

* * * * *